(12) United States Patent
Shiratori

(10) Patent No.: US 6,197,440 B1
(45) Date of Patent: Mar. 6, 2001

(54) MAGNETIC RECORDING MEDIUM

(75) Inventor: Tsutomu Shiratori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/418,834

(22) Filed: Oct. 15, 1999

(30) Foreign Application Priority Data

Oct. 16, 1998 (JP) ................................................. 10-295450
Dec. 25, 1998 (JP) ................................................. 10-376499

(51) Int. Cl.[7] ....................................................... G11B 5/66
(52) U.S. Cl. ................................. 428/694 SC; 427/131; 427/132; 428/592; 428/638; 428/694 ML; 428/694 MM; 428/694 EC; 428/694 RE; 428/900; 428/928
(58) Field of Search .................................. 427/131, 132; 428/694 ML, 694 MM, 694 EC, 694 SC, 694 RE, 900, 928, 592, 638

(56) References Cited

U.S. PATENT DOCUMENTS 5,956,296    9/1999   Yamamoto et al. .................... 369/13

FOREIGN PATENT DOCUMENTS 3-093058    4/1991   (JP) .
6-290496   10/1994   (JP) .
9-235885    9/1997   (JP) .

*Primary Examiner*—Bernard Pianalto
(74) *Attorney, Agent, or Firm*—Fitzpatrick, Cella, Harper & Scinto

(57) ABSTRACT

A magnetic recording medium comprises a stack of four magnetic layers. The first magnetic layer 11 is a layer for reproducing information recorded on the medium. The third magnetic layer 13 is a storage layer for storing information recorded on the medium in the form of domain walls. The second magnetic layer 12 has a lower Curie temperature Ts than the first and third magnetic layers and is interposed between the first and third magnetic layers. The fourth magnetic layer 14 is interposed between the first 11 and second 12 magnetic layers, and has a larger domain wall energy density than that of the first magnetic layer 11.

7 Claims, 12 Drawing Sheets

FIG.3A
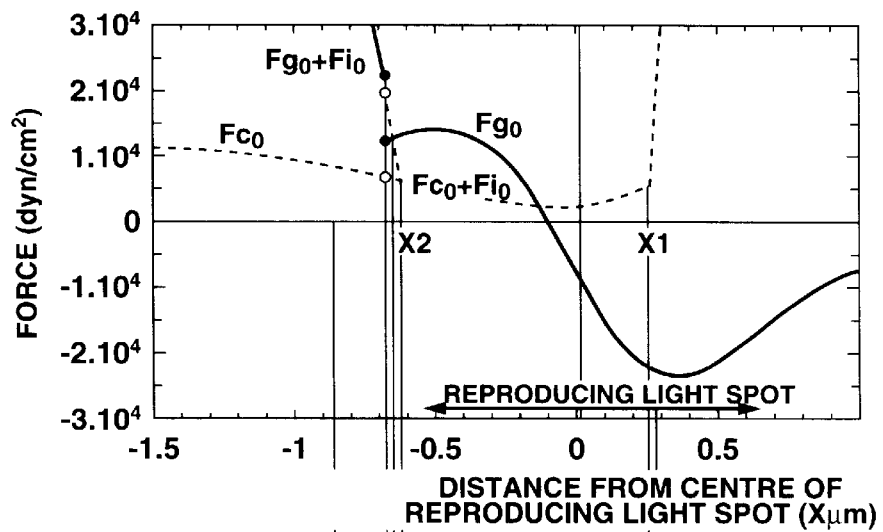
FIG.3B
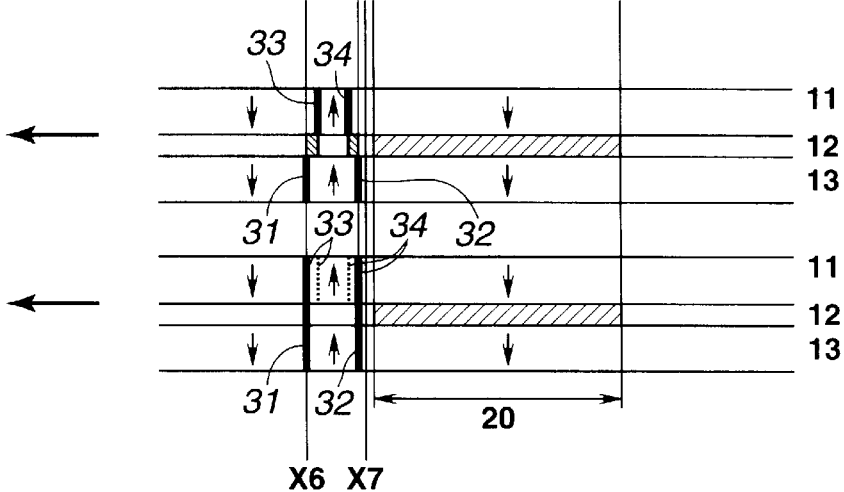
FIG.3C

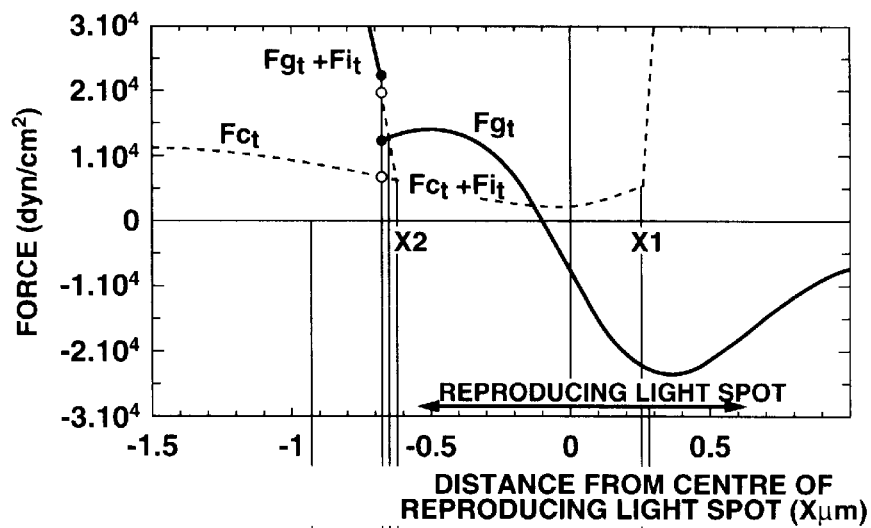
FIG.5A
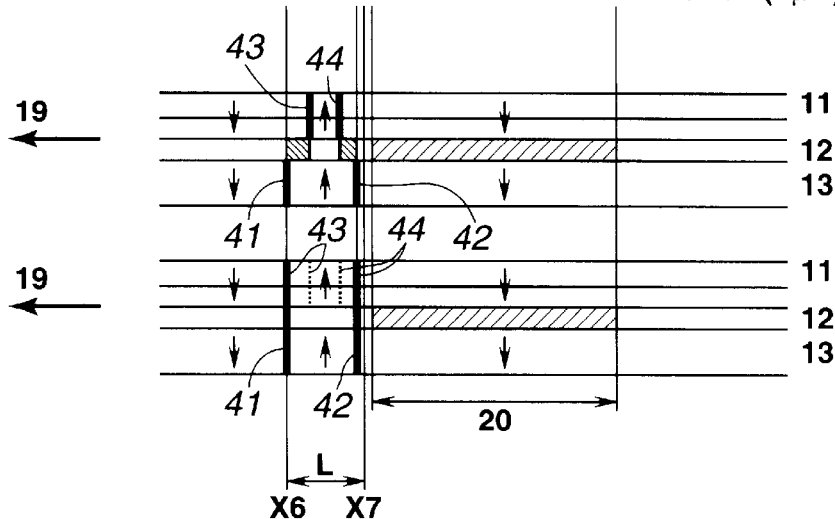
FIG.5B
FIG.5C

MAGNETIC RECORDING MEDIUM

BACKGROUND OF THE INVENTION

1. Field of the Invention

This invention relates to a magnetic recording medium on which information is recorded by the orientation states of magnetization in a magnetic material and information is reproduced using a light beam. The invention has particular, although not exclusive, relevance to a magneto-optical recording medium for use in domain wall displacement reproduction.

2. Description of the Related Art

Known magnetic recording media are being put to practical use as rewritable recording media. In particular, a magneto-optical recording medium, on which information is recorded by forming magnetic domains in a magnetic thin film utilizing the thermal energy of a semiconductor laser, the information being reproduced utilizing the magneto-optical effect, is expected to be used as a large capacity and rewritable medium on which it is possible to carry out recording of high density.

In recent years, due to the increasing digitalization of motion pictures, larger capacity recording media are required leading to a need to improve the recording density of these magnetic media.

In general, the line recording density of an optical recording medium strongly depends on the laser wavelength of the reproducing optical system and the aperture number NA of the objective lens used to focus the laser beam on the medium. In particular, the spatial frequency of the recording pit which is possible to reproduce is limited to about 2 NA since the beam waist is necessarily determined by the laser wavelength and the aperture number NA. Accordingly, it has been necessary to make the laser wavelength of the reproducing optical system shorter or to make the aperture number NA of the objective lens bigger in order to realize a high recording density in conventional optical recording media. However, making the laser wavelength shorter is not easy as this causes some problems in terms of generation of heat, efficiency of the laser device and the like. Furthermore, making the aperture number NA of the objective lens bigger causes the problem that the requirement of mechanical alignment become more strict because the depth of focus becomes shallow.

Therefore, various super resolution techniques, in which the recording density is improved by devising a structure of recording medium or a reproducing method without changing the laser wavelength and aperture number NA, are being developed. For example, JP-A-3-93058 describes a signal reproducing method in which the signal recorded on a multiple layer recording medium composed of a reproducing layer and a recording storage layer magnetically coupled with each other, is readout by transferring the recorded signal into the heated region of the reproducing layer by irradiating the reproducing layer with laser light after orienting the magnetization of the reproducing layer.

In this method, the region heated by the laser light to the transfer temperature is smaller than the diameter of the reproducing laser light spot. Accordingly, it is possible to reproduce a signal of spatial frequency greater than 2 NA because intersymbol interference is reduced when reproducing.

However, in this reproducing method, there is a disadvantage that the amplitude of the reproducing signal declines and a sufficient signal is difficult to obtain since the effective signal detecting area is smaller than the reproducing laser light spot diameter. As a result, it has been difficult to achieve a higher density than the recording density determined by the diffraction limitation of the optical system because it is difficult to make the effective signal detection area smaller.

To avoid the above problem, the present inventor has already proposed the magnetic recording medium and reproducing method described in JP-A-6-290496 in which it is possible to reproduce a signal of recording density greater than the resolution of the optical system without a decline in the amplitude of the reproducing signal. This is achieved by displacing the domain wall existing at the boundary portion between the recording marks towards the peak of the temperature gradient produced by the reproducing light spot and detecting the displacement of the domain wall.

However, in the method described in JP-A-6-290496, the peak of the temperature gradient is formed inside the reproducing light spot when forming the temperature gradient by heating the medium by the reproducing light beam itself. Therefore, both domain wall displacements from the front and from the rear of the relative direction of movement of the light spot to the medium are detected by the reproducing light beam. It has been difficult to obtain better signals because either domain wall displacement produces noise. Therefore, it is necessary to provide another light beam besides the reproducing light beam to form the predetermined temperature distribution, thus complicating the reproducing apparatus.

In JP-A-9-235885, it is proposed that the domain wall displacement from the rear of the light spot in the direction of relative movement of the light spot be restrained by applying a reproducing magnetic field. However, this complicates the reproducing apparatus because of the need to provide a magnetic field applying means.

SUMMARY OF THE INVENTION

It is an object of this invention to avoid the above problem. In particular, an object is to supply a magnetic recording medium in which signals are reproduced using a domain wall displacement technique in which the displacement of the domain wall from the rear of the reproducing light spot is at least reduced, without complicating the reproducing apparatus.

According to the present invention, there is provided a magnetic recording medium for reproducing information by detecting displacement of a domain wall, comprising:

a first magnetic layer;

a second magnetic layer for storing the information wherein the domain wall corresponds to the information;

a third magnetic layer having a lower Curie temperature than the first magnetic layer and the second magnetic layer and provided between the first magnetic layer and the second magnetic layer;

a further magnetic layer being interposed between the first and third magnetic layers, the further magnetic layer having a larger domain wall energy density than that of the first magnetic layer.

BRIEF DESCRIPTION OF THE DRAWINGS

Embodiments of the present invention will now be described, by way of example only, with reference to the accompanying drawings in which:

FIG. 3A illustrates the relationship between the forces acting on the domain walls in the magnetic layers of the medium of FIG. 1 and FIGS. 3B–C illustrate the movement of the domain walls due to the forces;

FIG. 5A illustrates the relationship between the forces acting on the domain walls in the magnetic layers of the medium of FIG. 4 and FIGS. 5B–C illustrate the movement of the domain walls due to the forces.

EMBODIMENTS OF THE INVENTION

Embodiments of the present invention will now be explained with reference to the drawings. However, firstly the principals of recording and reproducing on a magnetic recording medium using domain wall displacement will now be explained with reference to FIGS. 1–3.

Figure 1A:
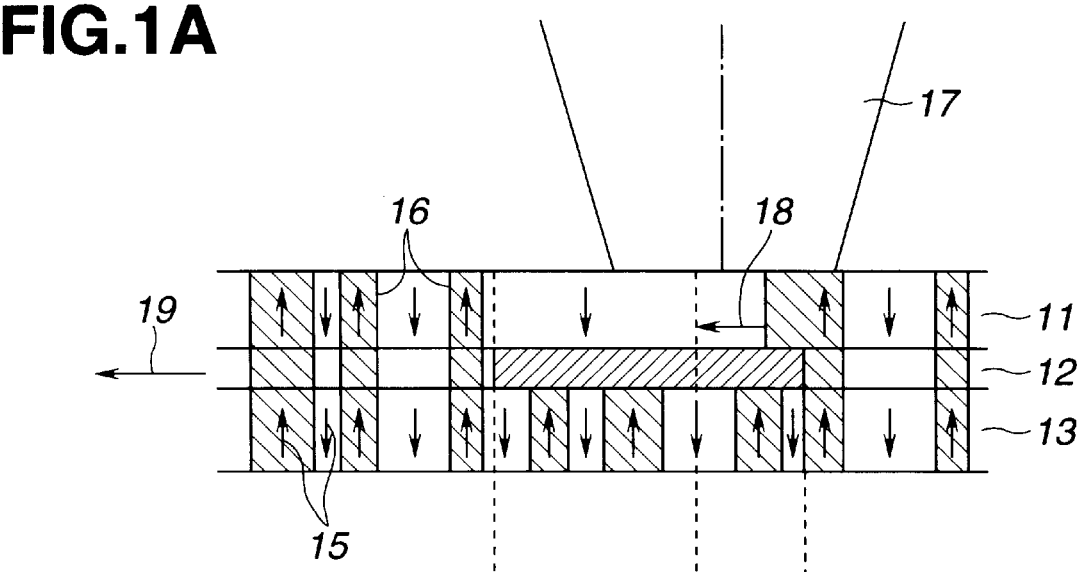
FIG. 1A illustrates a sectional view of a magneto-optical recording medium showing one example of the spin orientation state in each magnetic layer when reproducing.

Referring firstly to FIG. 1A, the magnetic layers of the medium comprise a first magnetic layer 11 which mainly contributes to reproducing, a second magnetic layer 12 that functions to interrupt exchange coupling between the first magnetic layer and a third magnetic layer, the third magnetic layer 13 being the layer in which the information is stored. The Curie temperature Ts of the second magnetic layer 12 is lowest among these magnetic layers. The magnetic layers are exchange coupled to each other at room temperature.

Information is stored in the third magnetic layer 13 by means of the directions of the magnetic spins 15. A domain wall 16, which is a transition region of spin orientation, is formed between two regions whose magnetisations are in opposite directions to each other.

Figure 1B:
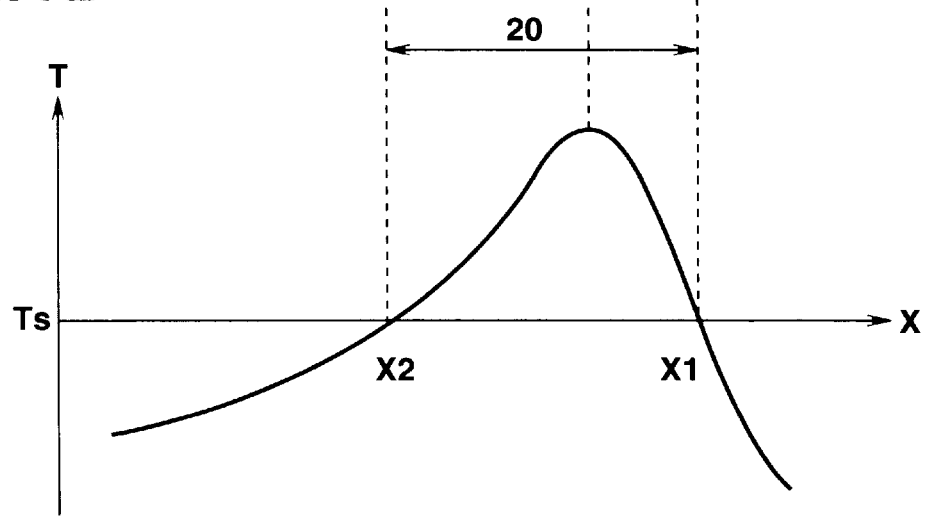
FIG. 1B illustrates temperature distribution formed on the magnetic recording medium of FIG. 1A moving relative to the light beam.

FIG. 1B illustrates the temperature distribution T produced over the medium when a reproducing laser beam 17 is directed on the medium. The arrow 19 represents the direction of movement of the medium, this causing the laser beam 17 to scan across the medium. In the region 20 between the positions X1 and X2, the medium reaches the Curie temperature Ts of the second layer 12, thus causing the exchange coupling between the first 11 and third 13 layers to be interrupted.

When the domain wall in the first magnetic layer 11 is within the region 20 where exchange coupling is interrupted, the domain wall starts to move in the direction 18 towards the peak of the temperature distribution, thus expanding the region contributing to a measurable reproduction signal.

The principal of a domain wall displacement detection method will now be explained in more detail.

When a temperature distribution is formed on the medium as shown in FIG. 1A, a distribution of domain wall energy density is formed and a gradient of domain wall energy density occurs in the X direction. As a result, force $F_{go}$ calculated by the following formula (1) acts on the domain wall existing at position X.

$$F_{go} = -\frac{d\sigma}{dX} = -\frac{d\sigma}{dT} \cdot \frac{dT}{dX} \qquad (1)$$

where σ is the domain wall energy density.

This force $F_{go}$ acts to move the domain wall towards a lower domain wall energy. In general, as the domain wall energy declines with a rise of temperature, the force $F_{go}$ acts towards the direction of the higher temperature.

As exchange coupling between the first magnetic layer 11 and the third magnetic layer 13 is interrupted in the region 20 between the position X1 and the position X2, the first magnetic layer 11 can be dealt with as an independent magnetic layer.

Force $F_{io}$ acts on the first magnetic layer 11 by exchange interaction from the third magnetic layer 13. Here, supposing the interface wall energy between the first magnetic layer 11 and the third magnetic layer 13 is $\sigma w_{13}$, the following formula (2) can be derived:

$$F_{io} = \sigma_{w13}/h_1 \qquad (2)$$

where $h_1$ is the thickness of the first magnetic layer 11. This force $F_{io}$ acts to move the domain wall in a direction in which the interface wall between the first magnetic layer 11 and the third magnetic layer 13 at X1 disappears. Where an interface wall does not exist between the first magnetic layer 11 and the third magnetic layer 13, and the domain wall in the first magnetic layer 11 is formed at the same position as the domain wall in the third magnetic layer 13, the force $F_{io}$ acts to prevent movement of the domain wall.

The force $F_{co}$ represented by the following formula (3) always acts to prevent displacement of the domain wall:

$$F_{co}=2Ms_1Hw_1 \qquad (3)$$

where $Ms_1$ is the saturation magnetisation of the first layer 11 and $Hw_1$ is the domain wall coercive force of the first layer 11.

Beside the above forces, it is believed that the demagnetizing field, floating magnetic field and the domain wall formed on both sides of a magnetic domain in a direction parallel to the direction of movement of the medium influence the action of the domain wall.

However, the influence of the demagnetising field and floating magnetic field can be reduced by making the saturation magnetisation small. Furthermore, the effect of the magnetic walls at the sides of the magnetic domain can be removed by the form of the recording track. This will be explained in more detail later.

Thus the influence of the demagnetizing field and the floating magnetic field and the influence of the domain wall produced on both sides of the magnetic domain will be disregarded in the following explanation.

Firstly, the following explanation uses the case of a single isolated domain wall to attempt to simplify the explanation.

Figure 2A:
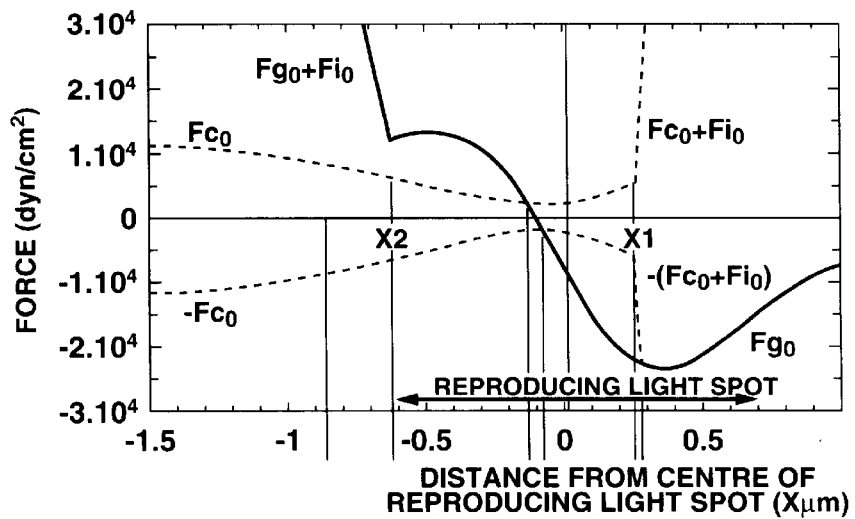
FIG. 2A illustrates the relationship between the forces acting on the domain walls in the magnetic layers of the medium of FIG. 1.
Figure 2B:
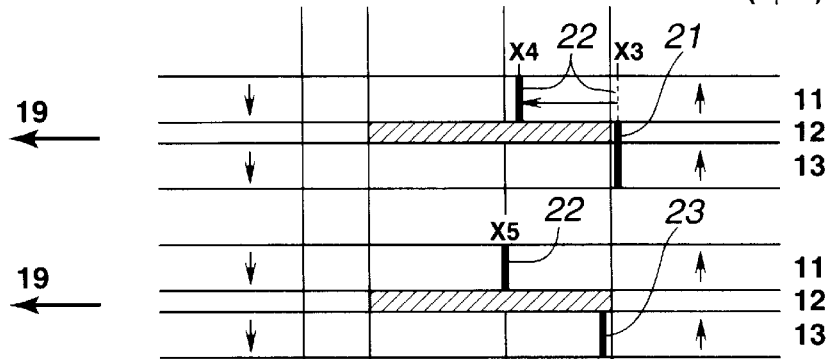
FIGS. 2B, 2C, 2D, 2E and 2F illustrate the movement of the domain wall due to the forces.

FIG. 2A illustrates graphically the relationship between the forces acting on the domain wall when the isolated domain wall 21 passes through an area where exchange interaction is interrupted because the medium is moving relative to the heated area from right to left on the paper, whilst FIGS. 2B to 2F illustrate the movement of the domain wall in the first magnetic layer 11 caused by the forces.

A positive force acts toward the right side of the figure and a negative force acts toward the left side of the figure.

FIG. 2 also illustrates, in the case that an adjoining domain wall has already passed through the area where exchange interaction is interrupted before nucleation generated after the domain wall in the third magnetic layer 13 passes through the area, the relationship between the force acting on the domain wall formed in the first magnetic layer 11 by nucleation, and the movement of the domain wall caused by the forces acting on the wall.

In the area to the right of the area where the exchange interaction is interrupted, the domain wall in the first magnetic layer 11 is fixed at the same position as the domain wall in the third magnetic layer 13 because the force $F_{io}$ acting on the first magnetic layer due to exchange interaction with the third magnetic layer 13 is dominant among the other forces. As a result, an interface wall does not exist between the layers. In this case, the force $F_{io}$ acts as a force to prevent the displacement of the domain wall. As the domain wall approaches the area where exchange interaction is interrupted, the force $F_{go}$ trying to move the domain wall toward the region of the higher temperature, that is, the left hand direction, acts on the domain wall on the basis of the gradient of the domain wall energy accompanying the temperature gradient. As shown in FIG. 2, when the domain wall 21 reaches to the position X3, the following formula (4) is satisfied.

$$|F_{go}|>|F_{co}+F_{io}| \qquad (4)$$

and only the domain wall portion 22 in the first magnetic layer 11 of the domain wall 21 move relative to the medium in the left hand direction, to stop moving relative to the medium when the formula (4) above stops being satisfied when the domain wall 22 reaches the position X4.

After this, although the domain wall 22 moves up to the position X5 accompanying the movement of the medium, if the domain wall 22 tries to move more towards the left side, the domain wall 22 is returned to the position X5 by the force acting in the right hand direction. In particular, the domain wall 22 stops relative to the heated area at the position X5 but continues to move relative to the medium towards the right hand direction. On the other hand, the remaining portion 23 in the third magnetic layer 13 of the domain wall 21 moves towards the left hand direction with the movement of the medium but without moving relative to the medium.

Hereby, the direction of the magnetization in the first magnetic layer 11 between the position X5 and the position where the domain wall started to move is orientated in the direction of the magnetization of the magnetic domain stored in the third magnetic layer 13 now being detected. As a result, it is possible to detect the state of the magnetic domain in the third magnetic layer 13 by detecting the reflected light beam from the medium by the detector system due to the change in the polarisation of the reflected light beam caused by the change in direction of magnetisation. The domain wall 23 in the third magnetic layer 13 keeps its initial state without moving relative to the medium because the third magnetic layer 13 has a sufficiently large domain wall coercive force. As a result, the recorded information is maintained in the medium.

The above explanation is in relation to an isolated domain wall. However, when the medium is rotated at constant velocity, the domain wall 22 in the first magnetic layer 11 moves to position X4 each time a domain wall 21 reaches position X3, enabling detection at intervals corresponding to the recorded information by the reproducing light beam.

By movement of the domain wall as described above, even if the domain walls are recorded at intervals shorter than the size of the reproducing light spot, it is possible to reproduce the recorded information. Namely, it is possible to improve the resolution regardless of the size of the reproducing light beam spot and also to be completely released from the optical diffraction limitation because the recording pattern is decomposed by the isothermal line corresponding to the position X3.

However, if the temperature distribution described above is obtained by heating the medium by the reproducing light beam, the displacement of the domain wall from the rear of the position X2 is detected with the displacement of the domain wall from the position X3. This displacement of the domain wall from the position X2 is not concerned with the required recording signal and creates noise. Therefore, it has been difficult to obtain a good reproducing signal. This will now be explained.

Figure 2C:
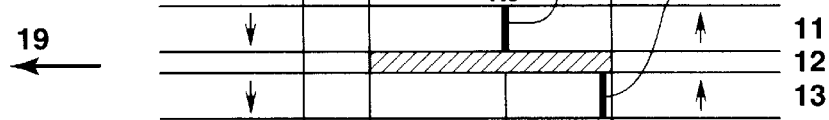
Figure 2D:
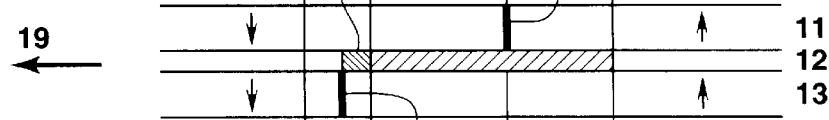

Following the state as shown in FIG. 2C, exchange interaction between the first magnetic layer 11 and the second magnetic layer 13 resumes after the domain wall 23 in the third magnetic layer passes through the position X2. As shown in FIG. 2D, in the region to the right hand side of the domain wall 23, interface wall 24 is being formed between the first magnetic layer 11 and the third magnetic layer 13 because the magnetic spins of the first magnetic layer 11 are antiparallel to the spins in the third magnetic layer 13.

Figure 2E:
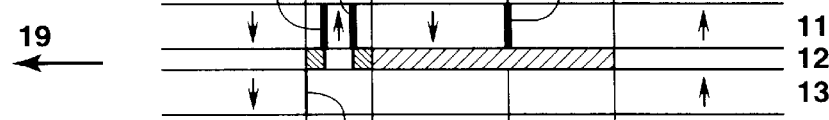

As shown in FIG. 2E, the interface wall 24 is formed over a region between position X2 and the position X6 when the domain wall 23 reaches position X6 due to the movement of the medium. The accumulated interface wall energy then exceeds the energy necessary for nucleation, that is, the minute magnetization reversion region firstly formed in the magnetic layer when magnetization reversal occurs, magnetization reversal finally occurring by expansion over the region. Then reversal nucleation is produced in the first magnetic layer 11. At this time, although the domain wall is formed around the reversal nucleus, supposing the domain wall at along both sides of the recording track can be ignored, the domain wall 25 and 26 are formed respectively before and behind the reversal nucleus along the recording track.

Figure 2F:
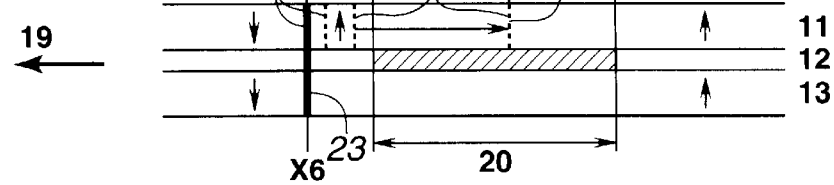

The domain walls 25 and 26 shown in FIG. 2F, move instantaneously to the left and to the right respectively. Thereby, the magnetization of the first magnetic layer 11 is reversed between the positions X2 and X6. The domain wall 25 moving in the left hand direction stops moving due to the disappearance of the interface domain wall 24 at the position X6 and after that, moves relative to the heated portion with the domain wall 23 in the third magnetic layer 13 in the left hand direction accompanied by the movement of the medium. In fact, it is thought that the domain wall 25 is formed at the position X6 from the beginning because the interface wall energy density increases due to the decline of the temperature away from the region 20 where the exchange interaction is interrupted and thereby occurrence of reversal nucleation becomes easier.

The stopping position of the domain wall 26 moving in the right hand direction is determined by the relationship of the forces acting on the domain wall 26. Firstly, force $F_{go}$ acts on the domain wall 26 by the gradient of domain wall energy according to the gradient of temperature and tries to move the domain wall 26 toward the higher temperature region, that is, the right hand direction. Secondly, force $F_{io}$ which tries to move the domain wall 26 in a direction making the interface wall between the first magnetic layer and the third magnetic layer disappear, that is, the right hand direction, acts on the domain wall 26 on the basis of exchange interaction with the third magnetic layer 13. Accordingly, as shown in FIG. 2F, the domain wall 26 stops moving when it reaches the position X5 where the following relationship (5) is satisfied:

$$F_{go}+F_{io}=F_{co} \quad (5)$$

In the case shown in FIG. 2F, the domain wall 22 which already exists at the position X5 combines with the domain wall 26 which has come from the rear of the position X2 and the domain wall disappears.

When heating the medium by the reproducing light beam, a peak portion of the temperature is formed inside the reproducing light spot. The position X5 is also formed inside the reproducing light spot. Therefore, displacement of the domain wall from the rear of the position X2 is detected by the reproducing light spot.

Referring now to FIG. 3, this figure illustrates the effect of the next domain wall 32. As shown in FIG. 3B, if the next domain wall 32 in the third magnetic layer 13 has already come into a portion where it is to the left of the position X7 where the following relationship (6) is satisfied before the domain wall 31 in the third magnetic layer 13 moves up to the position X6 due to the movement of the medium relative to the light spot, the above circumstances are different.

$$F_{co}+F_{io}=F_{go} \quad (6)$$

In this case, as shown in FIG. 3C, when the domain wall 34 of the two domain walls 33, 34 formed by nucleation, moves in the right hand direction up to the position of the domain wall 32, force Fi0 by exchange interaction with the third magnetic layer 14 acts on the domain wall 34 to prevent the movement of wall 34. As a result, as shown in FIG. 3C, the domain wall 34 stops at the position X7 satisfying the following formula (6), and after that moves in the left hand direction with the domain wall 32 in the third magnetic layer accompanying the movement of the medium.

$$F_{go}<F_{co}+F_{io} \quad (7)$$

Thus, the domain wall 34 does not move up to the position where it can be detected by the reproducing light spot.

Here, if the interval between recorded domain walls is shorter than the distance L between position X6 and the position X7, the magnetization between the position X5 and the position X7 of the first magnetic layer 11 is always oriented in one direction. Accordingly, the domain wall from the rear of the light spot does not contribute to the measured reproducing signal.

As a result, it is possible to obtain a good reproducing signal without providing a heating means other than the reproducing light beam for forming the necessary temperature distribution. In this case, either the length of the magnetic domain of the upward magnetization or that of the downward magnetization can be shorter than the distance L.

The inventor for the present application has found that when recording the information by mark length recording, if the distance L is not long enough, the variable range of the mark length is limited and the modulation system is greatly restricted. For example, in a (1-7) RLL (Run Length Limited) modulation code, to carry out recording of a shortest mark length 0.1 μm, it is necessary that the distance L is longer than at least 4 times the shortest mark length, namely, 0.4 μm.

The inventor for the present application has realised that in order to make the distance L long enough, it is necessary to make the accumulated interface wall energy small or make the energy necessary for nucleation, which is substantially equal to the sum of the coercive force energy and Bloch domain wall energy, in the first magnetic layer 11 large when the interface wall is formed over the region between the position X2 and the position X6. However, if the accumulated interface wall energy is not sufficient, the transcription characteristic of the magnetization from the third magnetic layer 13 to the first magnetic layer 11 becomes bad and a loss of signal is produced. As the result, the shortest mark length which it is possible to reproduce becomes longer, and it becomes difficult to reproduce a short mark length such as 0.1 μm.

The inventor for the present application has found that the above problem can be at least alleviated by the use of a medium in which a further layer 14 is inserted between the first and second layers 11, 12. This further layer 14 has a higher domain wall energy density than that of the first magnetic layer 11, the first and further magnetic layers together being the magnetic layers which make the domain wall move. This has the effect of avoiding the problem of the displacement of the domain wall from the rear of the light spot, that is the distance L is kept long enough as will now be described.

Figure 4:
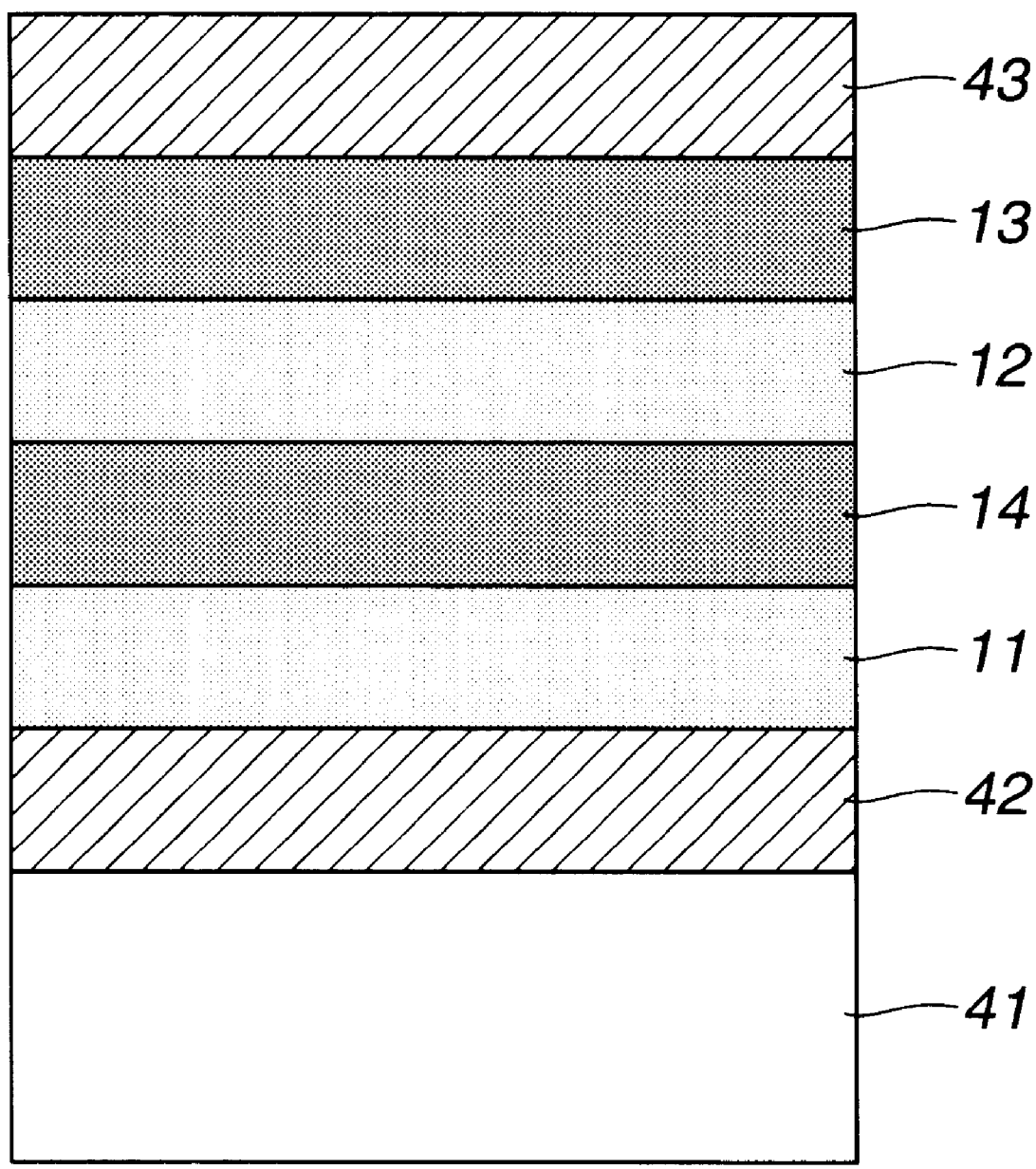
FIG. 4 illustrates a sectional view showing one example of the layer structure of a magnetic recording medium in accordance with an embodiment of the present invention.

Referring now to FIG. 4, this figure illustrates a medium in accordance with an embodiment of the invention.

In the medium shown in FIG. 4, the magnetic layers 11, 14, 12, 13 are formed in order on a substrate 41. An underlayer 42 is formed between the substrate 41 and the first magnetic layer 11. A protective layer 43 is formed over the third layer 13. These extra layers will be described in more detail later.

As in this medium, each domain wall energy densities of the first magnetic layer 11 and the further magnetic layer 14 are different each other, the forces acting on the domain walls in each magnetic layer are different to one another. However, the domain wall in each magnetic layer has the same movement at the same time because the magnetic layers are coupled strongly to one another by exchange coupling. That is because the interface wall energy increases between the first magnetic layer 11 and the further magnetic layer 14 if each domain wall in the first magnetic layer and the further magnetic layer 14 move independently due to their individual forces.

Thus the first and further layers 11, 14 can be regarded as a "unitary" layer with regard to the movement of domain walls within the layers. The forces $F_{gt}$, $F_{it}$, and $F_{ct}$ corresponding to forces $F_{go}$, $F_{io}$, $F_{co}$ in equations (1), (2), (3) above can be derived as follows:

$$F_{gt} = -\frac{d\sigma}{dX} \quad (8)$$

$$F_{it} = \sigma_{w43}/(h_1 + h_4) \quad (9)$$

$$F_{ct} = 2(Ms_1 \, Hwh_1 + Ms_4 \, Hw_4 \, h_4)/(h_1 + h_4) \quad (10)$$

where $h_4$ is the thickness of the further magnetic layer, $Ms_4$ is the saturation magnetisation of the further layer 14, and $Hw_4$ is the domain wall coercive force of the further layer 14.

The effect of this is to increase the distance L between positions X6 and X7 as described in relation to FIG. 3 and also improve the transcription characteristic as will now be explained with reference to FIG. 5 which illustrates the movement of the domain walls during reproducing of information from the four layer medium for the situations corresponding to those of FIG. 3. The reproducing light beam is again directed onto the medium from the direction of the first magnetic layer 11.

As shown in FIG. 5C, when the domain wall 44 of the two domain walls, 43, 44 formed by nucleation moves in the right hand direction, up to the position of the domain wall 42, force Fit by exchange interaction with the third magnetic layer 13 acts on the domain wall 44 to prevent the movement of wall 44. As a result, as shown in FIG. 5(c), the domain wall 44 stops at the position of the wall 42 satisfying the formula (11)

$$F_{gt} < F_{ct} + F_{it} \quad (11)$$

and after that moves in the left hand direction with the domain wall 42 in the third magnetic layer accompanying the movement of the medium. Thus, the domain wall 44 does not move up to the position where it can be detected by the reproducing light spot. As a result, it is possible to obtain a good reproducing signal without providing a heating means other than the reproducing light beam for forming the necessary temperature distribution.

In the magnetic recording medium in accordance with an embodiment of the present invention, because the domain wall energy density of the further magnetic layer 14 is set relatively higher than that of the first magnetic layer 11, the interface wall energy density between the further magnetic layer 14 and the third magnetic layer 13 becomes high enough in the region of the temperature sufficiently lower than the Curie temperature Ts of the second magnetic layer 12. That is, when the domain wall energy density of the second magnetic layer 12 increases due to a decline in temperature, it is possible to prevent the interface wall energy between the further magnetic layer 14 and the third magnetic layer 13 from not increasing enough because the interface wall in the second magnetic layer 12 spreads into the first magnetic layer 11 which has the lower domain wall energy density. This means that with this structure it is easy to accumulate the interface wall energy necessary for the transcription of the magnetization from the third layer 13 to the first layer 11.

Furthermore, the energy necessary for nucleation in the first magnetic layer 11 and the further magnetic layer 14 becomes large because the domain wall energy density in the further magnetic layer is high. Therefore, it become difficult to cause nucleation in the region of the temperature near the Curie temperature Ts of the second magnetic layer. As a result, it is possible to reproduce short marks because the distance L becomes long enough and also transcription of the magnetization reliably occurs in the region of the temperature sufficiently lower than the Curie temperature Ts of the second magnetic layer 12 because there is a sufficient accumulation of the interface wall energy in the second magnetic layer until the temperature of the medium declines in the region.

The domain wall energy density of the further magnetic layer 14 at room temperature is preferably two to six times as large as that of the first magnetic layer 11. The domain wall energy density of the first magnetic layer 11 at room temperature is preferably about 0.5 to 3 erg/cm$^2$ and that of the further magnetic layer 14 is preferably about 3 to 7 erg/cm$^2$.

The Curie temperature of the further magnetic layer 12 is preferably set at a lower temperature than that of the first magnetic layer 11 and the third magnetic layer 13. Thereby, the Curie temperature of the further magnetic layer 14 becomes close to that of the second magnetic layer 12. As a result, the portion of the further magnetic layer having a temperature near the Curie temperature of the second magnetic layer has a moderately large nucleation energy when reproducing.

Furthermore, the first magnetic layer 11 is preferably formed so that Curie temperature declines stepwise or continuously in the direction of thickness approaching the further magnetic layer 14. Thereby, it is possible to move the domain wall stably because the domain wall driving force is large relative to the domain wall coercive force acting on the domain wall in the first magnetic layer 11.

A portion of both regions along the recording track preferably have a structure such that the respective exchange interactions in the in-plane direction in the first magnetic layer 11 and the further magnetic layer 14 is interrupted or at least reduced. Thereby, it is possible to move the domain wall more stably because no closed domain wall is formed. This will be described in more detail later.

In addition to the above explanation, the state of magnetization reversion occurring in the first magnetic layer 11 and the further magnetic layer 14 during reproducing may be a state in which the domain wall displacement mode in which the magnetisation is gradually reversed accompanying the domain wall displacement and the simultaneous rotation mode in which all the magnetisation is reversed at the same time being mixed. Further, it is thought that the displacement of the domain wall occurs because the thickness of the domain wall in the first magnetic layer 11 and the further magnetic layer 14 widen when exchange interaction between the further magnetic layer 14 and the third magnetic layer 13 is interrupted.

Furthermore the relationship between the direction of magnetic spin and the direction of the detected magnetization has two cases, i.e. they are in parallel or they are in antiparallel to each other in adjacent magnetic layers. Moreover, the direction of magnetic spin need not necessarily be perpendicular to the surface of the layers.

Figure 6:
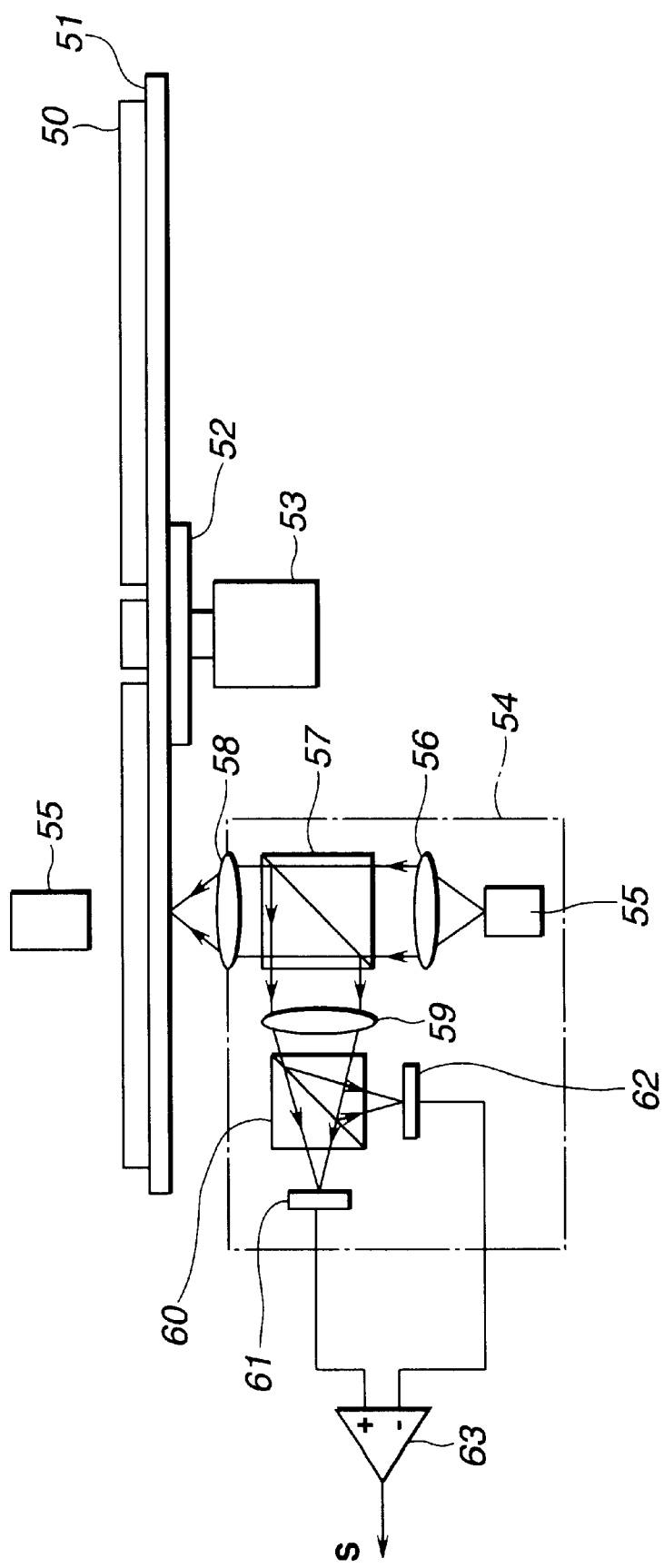
FIG. 6 is a schematic view of a recording and reproducing apparatus for recording information on, and reproducing information from, a magneto-optical medium.

Referring now also to FIG. 6, this figure illustrates an apparatus for recording information on and reproducing information from a magneto-optical medium such as that illustrated in FIG. 4. The apparatus includes a turntable 51 on which the medium 50 is placed, the turntable being rotatable by a spindle motor 53. The apparatus also includes an optical head indicated generally as 54 effective to illuminate successive portions of the medium with a light beam and a magnetic head 55 effective to apply a magnetic field to the illuminated portion of the medium.

The optical head 53 includes a semi-conductor laser 56 and lenses 57 and 58 effective to focus light from the laser onto the medium. A beam splitter 59 is positioned in the light path between the laser 56 and the medium 50 effective to separate light reflected from the medium 50 and to direct the reflected light onto a detection system 60–63 to produce a signal representative of the magnetic information recorded on the recording medium by means of the polarisation state of the reflected light which has undergone a Kerr rotation dependent on the state of magnetisation of the illuminated portion of the magnetic recording medium 50.

Recording of the information on the medium can be carried out by thermal magnetic recording or by magnetic recording. In thermal magnetic recording, there are two possible methods. An external magnetic field modulated according to the information to be recorded can be applied while irradiating the medium with laser light having a constant power sufficient to raise the temperature of a portion of the third magnetic layer above the temperature of the third magnetic layer. Alternatively, the medium may be irradiated with the laser light having at least two intensities, one being an intensity sufficient to heat a portion of the third magnetic layer above the Curie temperature, and the other being an intensity not sufficient to raise the temperature of the third magnetic layer above the curie temperature, the laser beam being modulated in intensity according to the information to be recorded while a unidirectional magnetic field is applied. In the latter case, it is possible to form a recording magnetic domain less than the diameter of the light spot by adjusting the intensity of the laser light so that only a predetermined region in the light spot on the medium is heated above the Curie temperature of the third magnetic layer. As a result, it is possible to form a higher density recording pattern than the diffraction limitation of the optical system.

Further details of the structure of a magnetic recording medium in accordance with an embodiment of the present invention will now be given.

Referring now again to FIG. 4, the substrate 41 is preferably made of material such as polycarbonate, acrylic resin, or glass. The under layer 42 and the upper layer 43 are preferably made of a dielectric material such as SiN, AiN, SiO, ZnS, MgF and TaO. The substrate 41 need not necessarily be made of a transparent material if the displacement of the domain wall is not detected optically. Furthermore, layers other than the magnetic layers are not necessarily needed in a medium in accordance with the present invention.

The order of the magnetic layers may be reversed. A metallic layer made of Al, AlTa, AlCr, Cu, Pt, Au etc. may be added in order to adjust the thermal characteristics of the medium. A protective coat made of high molecule resin or the like may be added, or two substrates carrying respective layers may be stuck together.

The layers can be formed by continuous sputtering or continuous vacuum evaporation by magnetron sputtering. In particular, each magnetic layer 11–14 may be made to exchange couple with one another by being continuously formed without breaking the vacuum.

Each magnetic layer 11–14 can comprise a magnetic material as is generally used in magnetic recording media or optical magnetic recording media, or other magnetic materials such as magnetic bubble material or anti-ferromagnetic materials. For example, each magnetic layer 11–14 may comprise a rare earth/iron group amorphous alloy which consists of 10–40 atomic % of one or more rare earth elements such as Pr, Nd, Sm, Eu, Gd, Tb, Dy, Ho, Er and 90–60 atomic % of one or more iron group elements such as Fe, Co or Ni. To improve the corrosion resistance or the like, Cr, Mn, Cu, Ti, Al, Si, Pt, In etc may be added in a small amount to these alloys. Also, platinum group/iron group periodic structure film is consist of Pt/Co, Pd/Co or the like, platinum group/iron group alloy film, anti ferromagnetic material is consisted of Co—Ni—O, Fe—Rh alloy or the like, magnetic garnet material, and the like can be available.

In case of heavy rare earth/iron group amorphous alloys, the saturation magnetization can be controlled by adjusting the compositional ratio between the rare earth and iron groups. For example, at compensation composition, it is possible to make saturation at room temperature 0 emu/cc. The Curie temperature can also be controlled by adjusting the composition ratio. To control the Curie temperature independently of saturation, a method which substitutes Co for a part of the Fe in the iron group and the amount of the substitution being controlled, is preferable. Namely, because the rise of Curie temperature of about 6 degrees C. is expected by substituting Co for 1 atomic % of Fe, it is possible to control the Curie temperature by adjusting the amount of additional Co. Further, it is possible to reduce the Curie temperature by adding a very small amount of non-magnetic elements such as Cr, Ti, Ti, Al. Also, by using two or more rare earth element it is possible to control the Curie temperature by adjusting the composition ratio.

Although the domain wall coercive force and domain wall energy density of each magnetic layer 11–14 is controlled mainly by choice of materials, it is also possible to control by adjusting the conditions of formation such as the pressure of the sputtering gas, the state of the surface of the substrate or each magnetic layer. In this connection, a material such as Tb, Dy has a large domain wall coercive force and domain wall energy density whilst material such as Gd have small values. It is also possible to control the values by adding an impurity.

The thickness of each magnetic layer 11–14 can be controlled by speed of formation or time.

An embodiment of the invention will now be explained in further detail as follows, with reference to an example.

EXAMPLE 1

After setting up each target of B-doped Si, Gd, Dy, Tb, Fe, Co in a direct-current magnetron sputtering apparatus and fixing a polycarbonate base plate on which has been formed a tracking guide groove on a substrate holder in the apparatus, the chamber of the apparatus was evacuated to less than $1\times10^{-5}$ Pa by using a cryopump. Ar gas was then introduced to a pressure of 0.5 Pa whilst vacuous exhausting took place. The various layers were formed by sputtering from the targets while rotating the substrate. When forming the SiO layer, in addition to Ar gas, $N_2$ gas was introduced, the layer being formed by direct-current reactive sputtering.

Firstly, an under layer of SiO was formed to a thickness of 90 nm. Following this, GdFe as the first magnetic layer 11, GdDyFeCo as the further magnetic layer 14, TbFe as the second magnetic layer 12, TbFeCo as the third magnetic layer 13 were formed of thicknesses 30 nm (h1), 10 nm (h4), 10 nm (h2), 80 nm (h3) respectively in order. Finally, a 50 nm protective layer of SiN was formed.

The composition ratio of each magnetic layer was controlled by adjusting the ratio of power given to each target of Gd, Dy, Tb, Fe, Co. Each magnetic layer was adjusted to have a composition near the respective compensation composition. The Curie temperature Tc1 of the first magnetic layer 11 and the Curie temperature Tc4 of the further magnetic layer 14 were set at about 230° C. The Curie temperature Ts of the second magnetic layer 13 was set at 160° C. and the Curie temperature of the third magnetic layer 13 was set at about 290° C.

The further magnetic layer 14 was arranged to have an increased anisotropy by adding Dy to the material of the first magnetic layer 11, with the resistant decline of the Curie temperature of the second layer being compensated for by the addition of Co. Thereby, the domain wall energy density and coercive force of the further magnetic layer 14 was larger than of the first magnetic layer 11.

The saturation magnetisation of the first magnetic layer and the further magnetic layer at room temperature was about 50 emu/cc. The coercive force of the first magnetic layer 11 was 500 Oe whilst that of the further magnetic layer 14 was 4.5 kOe. Thereby, where the first magnetic layer 11 and the further magnetic layer 14 are exchange coupled to each other and can be considered a unitary layer, the nucleation energy of the unitary layer is estimated to be about four times as large as that of only the first magnetic layer.

By making the saturation magnetisation small, it is possible to control the influence of the demagnetising field and floating magnetic field.

Figure 7:
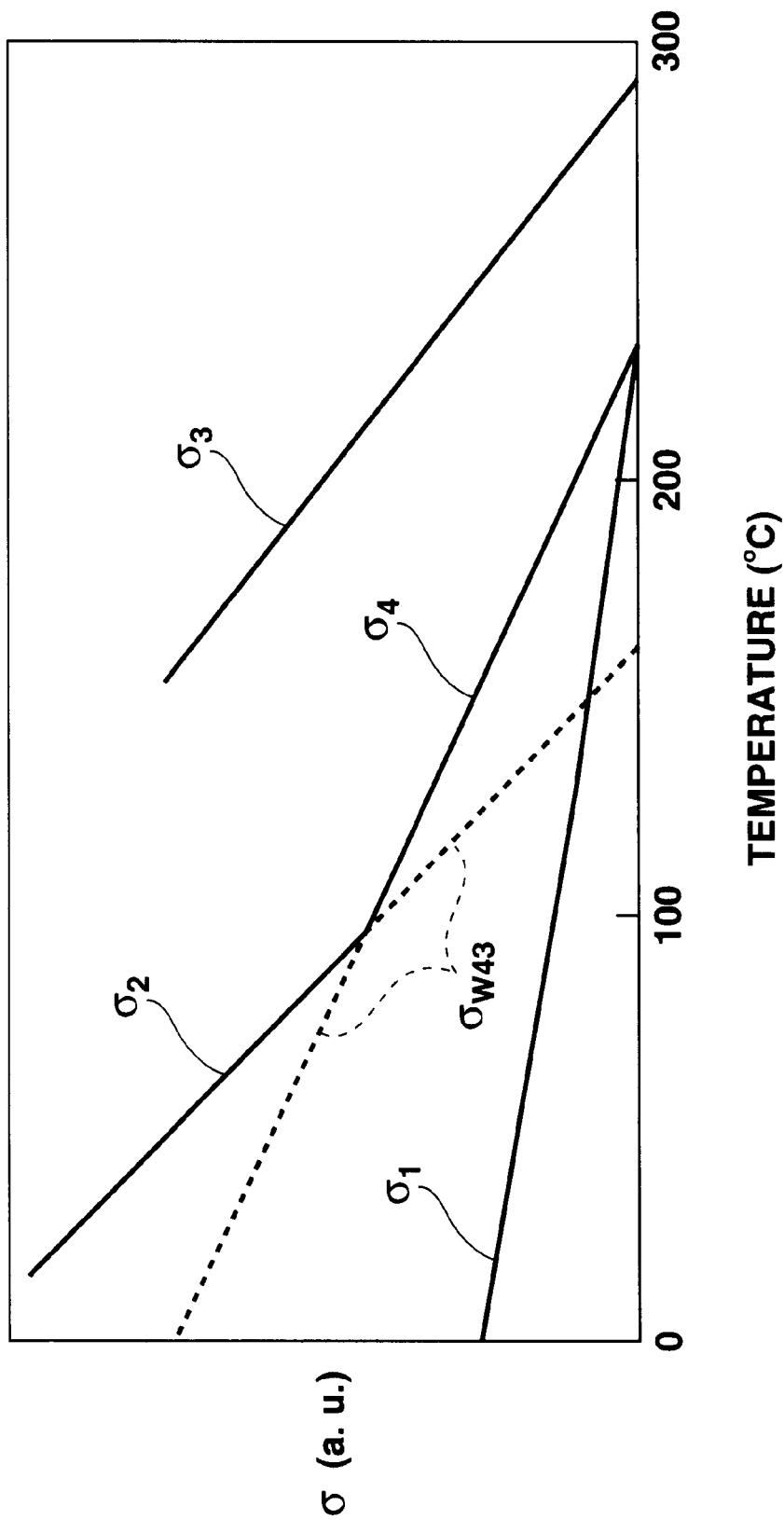
FIG. 7 illustrates the temperature dependent characteristics of the domain wall energy density of the magnetic layers of a magnetic recording medium in accordance with the first embodiment of the invention and the temperature dependence characteristics of interface domain wall energy density between the layers.

The temperature dependent characteristics of domain wall energy density $\sigma_i$ (i=1 to 4) of the four magnetic layers of this sample are shown by the lines $\sigma_1$, $\sigma_2$, $\sigma_3$, $\sigma_4$, in FIG. 7. Also, the temperature dependent characteristics of the interface wall energy density between the further magnetic layer 14 and the third magnetic layer 13 is shown by the broken line $\sigma_{w43}$ in FIG. 7.

COMPARATIVE EXAMPLE 1

The sample was made in a similar manner to Example 1 except for the further magnetic layer 14. The temperature dependent characteristics of the domain wall energy density $\sigma_i$ (i=1 to 3) of the three magnetic layers 11, 12, 13 of this sample are shown by the full lines in FIG. 8. Furthermore, the temperature dependent characteristics of the interface wall energy density between the first magnetic layer 11 and the third magnetic layer 13 is shown by the broken line $\sigma_{w13}$ in FIG. 8.

Figure 8:
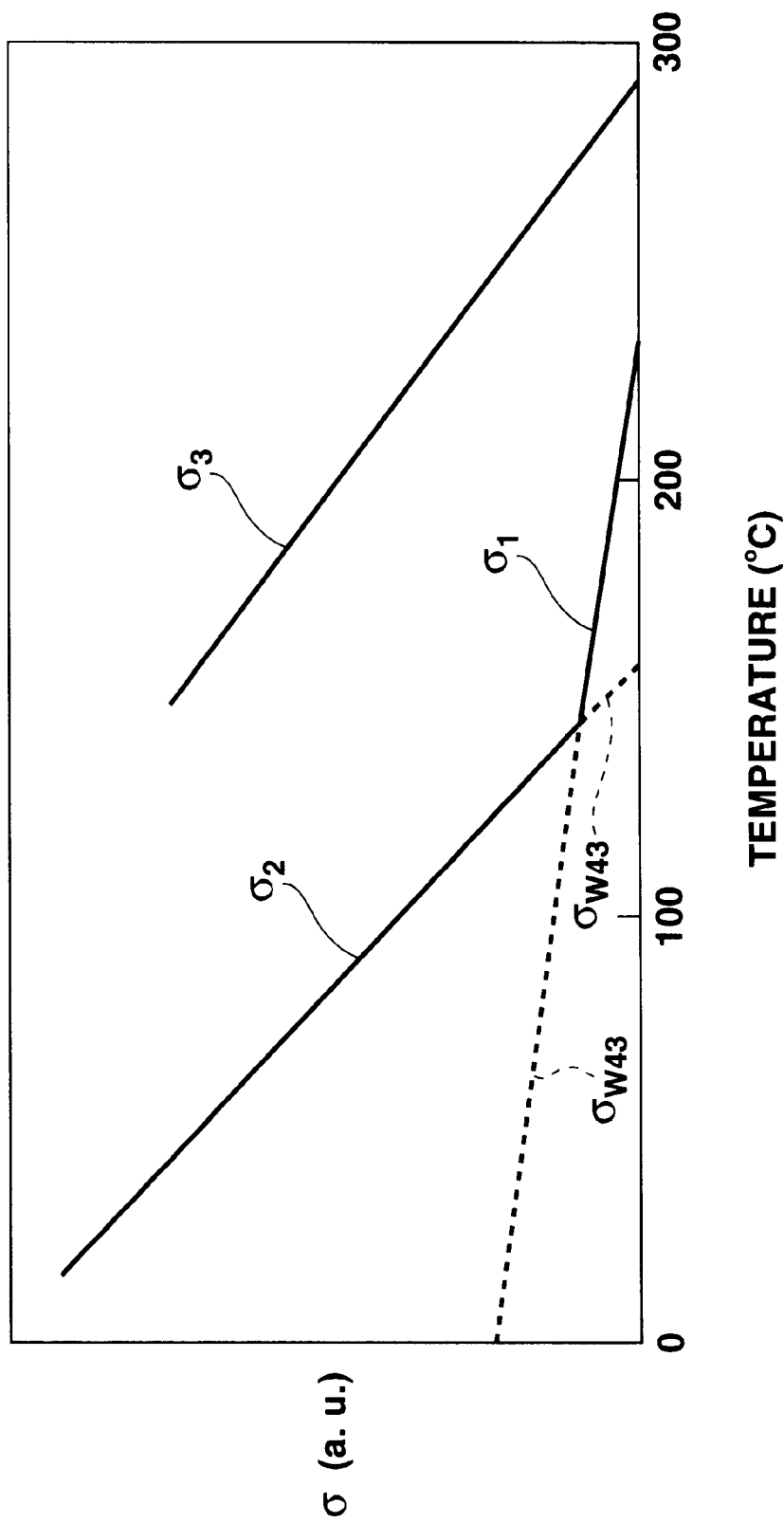
FIG. 8 illustrates the temperature dependent characteristics of the domain wall energy density of the magnetic layers of a comparative example of a magnetic recording medium and the temperature dependent characteristics of interface wall energy density between the layers.

As can be understood from FIG. 8, in comparison to Example 1, the domain wall energy density of the second magnetic layer 12 increases when the temperature of the medium declines sufficiently enough below the Curie temperature Ts of the second magnetic layer. However, the interface wall does not increase because the interface wall shifts inside the adjoined magnetic layers whose domain wall energy density are lower.

On the other hand, as can be seen from FIG. 7, in Example 1, because the second magnetic layer 12 adjoins the further magnetic layer 14 which has a relatively larger domain wall energy density $\sigma_4$, the interface wall energy density increases even when the temperature of the medium declines. Therefore, even if the nucleation energy is four times as large as that of the sample of Comparative Example 1, it is possible to certainly transfer the magnetic domain at low temperatures.

Evaluation of the characteristics of each sample of Example 1 and Comparative Example 1 was carried out by using a conventional magneto-optical disk evaluation apparatus having a magnetic head for magnetic field modulation as is well-known. The sample was rotated at a linear velocity of 1.5 µm/sec. When recording, by modulating the magnetic field at 200 Oe while irradiating the medium with a continuous laser light, the pattern composed of the upward and downward magnetization areas corresponding to the modulated magnetic field was formed in the cooling process after heating the medium over the Curie temperature of the third magnetic layer 13.

Figure 9A:
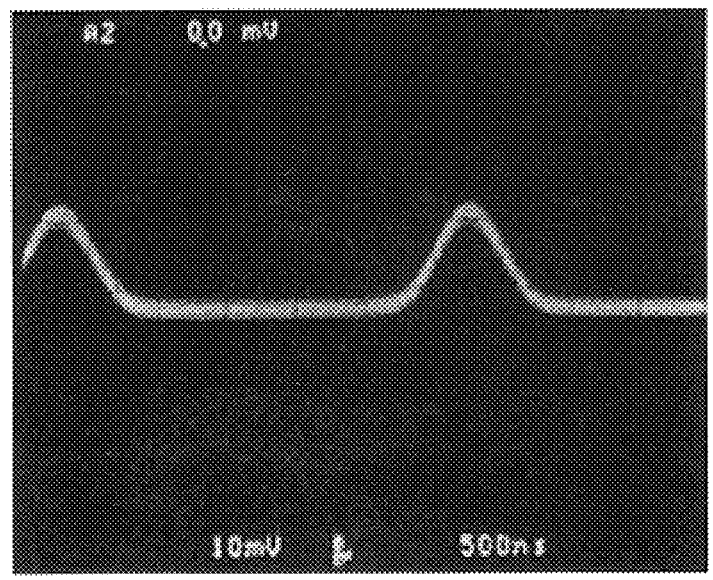
FIG. 9A illustrates a oscilloscope trace showing a reproducing signal observed from the recording medium of Example 1 using a reproducing laser power Pr of 0.8 mW.

Firstly, a mark of 0.45 µm was recorded at a period of 4.5 µm on the sample of the Comparative Example 1. After that, the mark was reproduced by a reproducing laser beam at powers of 0.8 mW and 1.5 mW. The signal traces observed on an oscilloscope are shown in FIG. 9A and FIG. 9B.

Where heating occurs by the reproducing laser beam itself, normally the peak of the temperature distribution is formed inside the light spot on the medium with isothermal lines at the Curie temperature Ts of the second magnetic layer 12 being formed before and behind the light spot. As a result, both domain wall displacements from front and rear in the direction of relative movement of the light spot on the medium are detected by the reproducing light beam. When the light spot is moving relative to the medium, heating accumulates more behind the light spot. Therefore, the peak of temperature distribution is formed behind the center of the light spot.

Figure 9B:
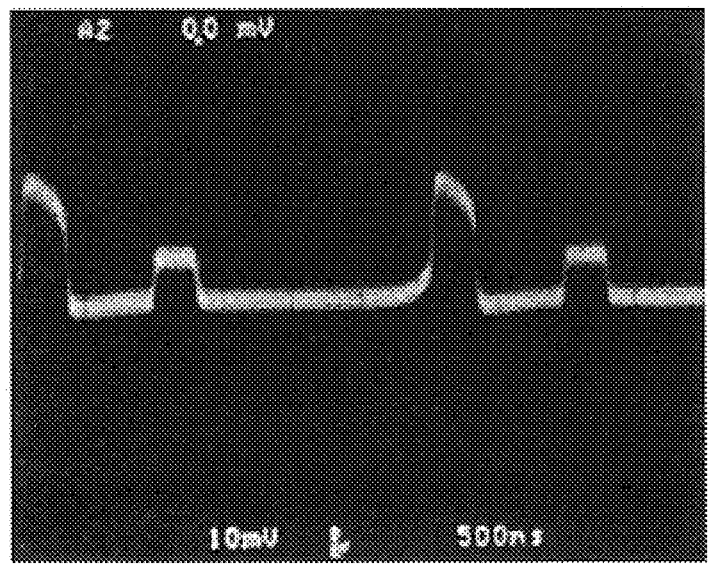
FIG. 9B illustrates a oscilloscope trace showing a reproducing signal observed from the recording medium of Example 1 using a reproducing laser power Pr of 1.5 mW.

In case of the reproducing laser beam having a power of 0.8 mW, reproducing as in conventional reproducing methods, that is non domain wall movement, occurs because the temperature of the medium does not reach the temperature Ts at which the domain wall starts to move. As shown in FIG. 9A, a normal reproducing trace was observed because it was possible to reproduce the isolated mark recorded at a period of 4.5 µm even using conventional reproducing methods not using domain wall displacement.

Where the reproducing laser light has a power of 1.5 mW, as shown in FIG. 9B, two peculiar square waves caused by the domain wall displacement whose amplitude is different to each other are observed at the same time because a region of the medium reaching the temperature Ts is formed. In FIG. 9B, the square wave having the larger amplitude originates from the displacement of the domain wall due to the isothermal line of the temperature Ts formed at the front of the light spot in the direction of relative movement of the light spot. The other square wave originates from the displacement of the domain wall due to the isothermal line of the temperature Ts at the rear of the light spot in the direction of relative movement of the light spot. The amplitude of the signal wave on the basis of the displacement of the domain wall from the rear isothermal line of temperature Ts is smaller because the peak of temperature distribution, which is a terminal point for the displacement of the domain wall, is formed behind the center of the light spot. The leading edge of each signal trace shows a change of signal level on the basis of the displacement of the domain wall of the front of the recording mark. The trailing edge of each signal trace shows a change of signal level on the basis of the displacement of the domain wall at the rear of the recording mark. The leading edge and the trailing edge of the signal from the front is indistinct. This is because the magnetization state before the domain wall starts to move is detected because the front isothermal line of temperature Ts is formed inside the reproducing light spot.

Different lengths of marks were measured in the same way. As a result, for a mark length of less than 0.25 µm, the square wave having a smaller amplitude does not appear. Only displacement of the domain wall from the front isothermal line Ts is detected. From this, in this sample, it is understood that the distance L between the position X6 and the position X7 was about 0.25 µm.

Next, the sample of Example 1 was measured in the same way. This resulted, for mark lengths of less than 1.0 µm, in the square wave formed by the displacement of the domain wall from the rear isothermal line Ts not appearing. The distance L was approximately four times as long as for the Comparative Example 1.

Figure 10A:
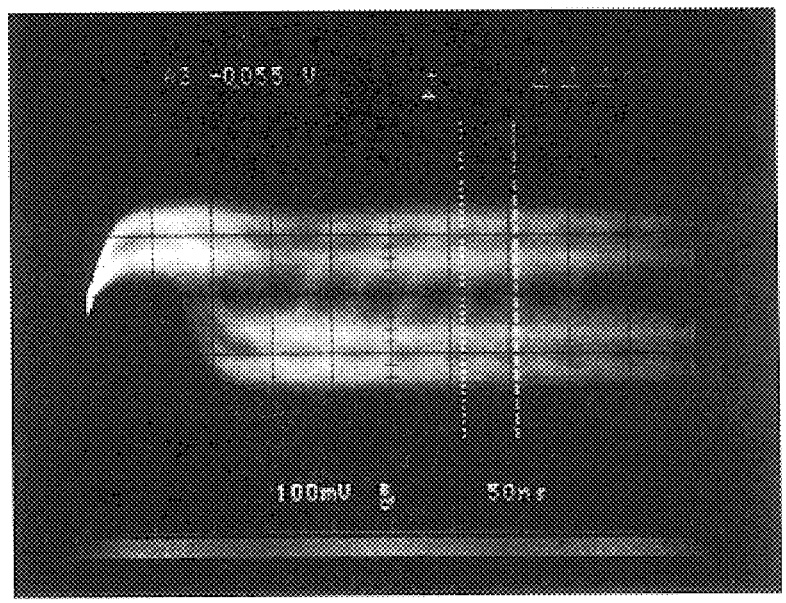
FIG. 10A illustrates a oscilloscope trace showing a eye pattern observed from the recording medium of the Example 1 using a reproducing laser power Pr of 1.5 mW.
Figure 10B:
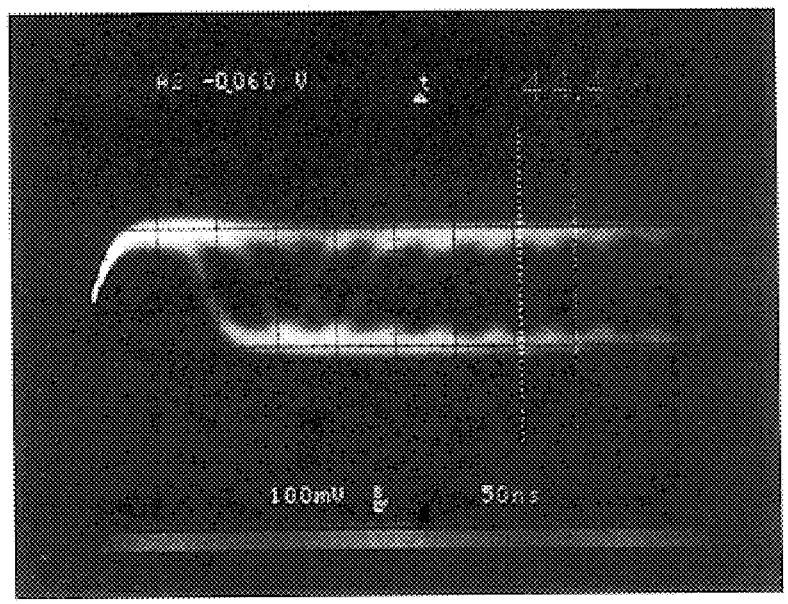
FIG. 10B illustrates a oscilloscope trace showing a eye pattern observed from the recording medium of the first embodiment using a reproducing laser power Pr of 1.5 mW.

Turning now also to FIG. 10, in each sample the signal to noise ratio C/N was measured for a mark of 0.1 µm and found to be about 40 dB for both samples. Recording of a bit length of 0.1 µm was done by (1-7) RLL modulation system for both samples. As a result, in the sample of the Comparative Example 1, jitter measurement was impossible because a good eye pattern was not obtained as shown in FIG. 10A. However, in the sample of the Example 1, a good eye pattern was obtained as shown in FIG. 10B and a sufficient jitter margin was measured. This is because in the sample of Example 1 in which the distance L was about 1.0 µm, the signal on the basis of the displacement of the domain wall from the rear was not mixed because the length of the recorded mark was limited to be less than about 0.533 µm in a (1-7) RLL modulation system using a bit length of 0.1 µm.

EXAMPLE 2

The sample was the same as the sample of Example 1 except that the further magnetic layer 14 of TbFe was formed of a thickness $h_4$ of 5 nm and the second magnetic layer 12 was formed of TbFeAl of a thickness $h_2$ of 10 nm by the addition of an Al target. The sample was adjusted so that the Curie temperature Tcf of the further magnetic layer 14 was 160° C. and the Curie temperature Ts of the second magnetic layer 12 about 140° C.

The saturation magnetisation of the second magnetic layer 12 was about 50 emu/cc at room temperature and the coercive force was more than 20 kOe at room temperature. Where the first magnetic layer and the further magnetic layer are exchange coupled to each other to produce a hypothetical unitary layer in this sample, the nucleation energy of the unit layer is very large at room temperature. However, the nucleation energy becomes moderately large near the Curie temperature Ts of the second magnetic layer 12 because the Curie temperature of the further magnetic layer 14 is lower than that of the first magnetic layer 11 and is near to that of the second magnetic layer 12.

Figure 11:
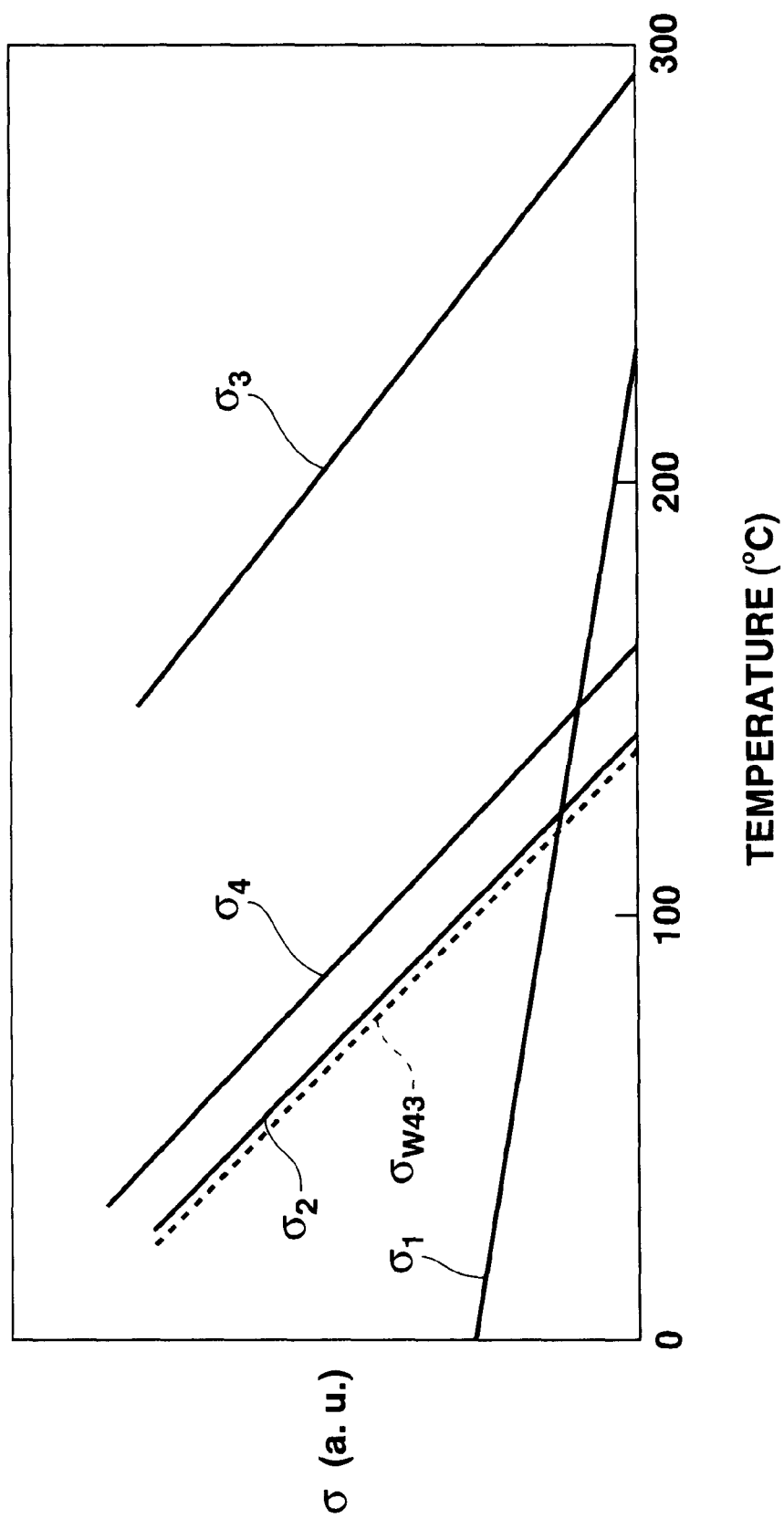
FIG. 11 illustrates the temperature dependent characteristic of the domain wall energy density of the magnetic layers of a recording medium of a second embodiment of the invention and the temperature dependent characteristic of the interface wall energy density between the layers.

Temperature dependent characteristics of domain wall energy density $\sigma_i$ (i=1 to 4) of the four magnetic layers of this sample are shown by the full lines in FIG. 11. The temperature dependent characteristic of the interface wall energy density $\sigma_{43}$ between the further magnetic layer and the third magnetic layer is shown by the broken line in FIG. 11.

In this example, the interface wall is shut inside the third magnetic layer until transcription of the magnetization and a large interface wall energy can be maintained because the domain wall energy of the further magnetic layer is more than the domain wall energy of the second magnetic layer in all temperature ranges.

Also, the displacement of walls in the first magnetic layer become smooth at temperatures exceeding the Curie temperature of the second magnetic layer because the Curie temperature of the further magnetic layer 4 is lower than that of the first magnetic layer 11. As a result, the noise measured when reproducing declines.

The recording/reproducing characteristics of the magnetic recording medium of this example were measured in the same way as for Example 1. As a result, the distance L was found to be more than 1.0 µm and the C/N was 42 dB for a mark length of 0.1 µm.

EXAMPLE 3

The first magnetic layer 11 was composed of three sub layers formed in order.

Firstly, a GdFeCoAl layer having a Curie temperature Tc13 of 280° C. was formed with a thickness $h_{13}$ of 10 nm. Next a GdFeCoAl layer having a Curie temperature Tc12 of 210° C. was formed of a thickness $h_{12}$ of 10 nm. Finally, a GdFeCoAl layer having a Curie temperature Tc11 of 165° C. was formed of a thickness $h_{11}$ of 10 nm. The second magnetic layer 12, the third 13 and the further 14 magnetic layers were formed of the same materials and of the same thickness as in Example 2. The composition ratio was adjusted so that each magnetic layer had a composition near the compensation composition.

The recording/reproducing characteristics of the magnetic recording medium of this example were measured in the same way as for Example 1. As a result, the distance L was found to be more than 1.0 µm and the C/N was 45 dB for a mark length of 0.1 µm.

FURTHER EXAMPLES

As mentioned above, the domain wall formed on both sides of a magnetic domain in a direction perpendicular to the direction of the medium will influence the movement of the domain walls. The following examples show structures in which this effect is at least reduced.

Figure 12:
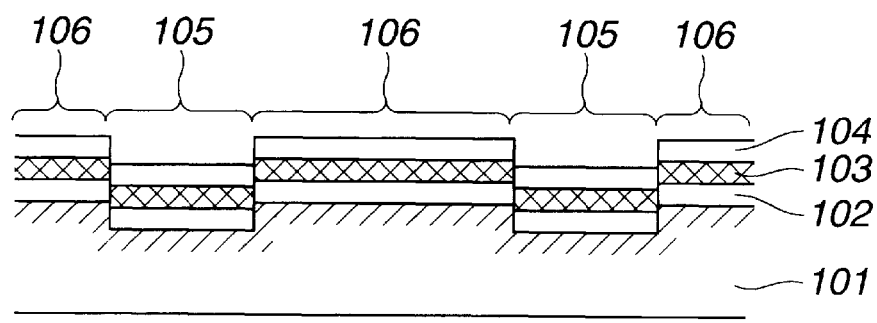
FIGS. 12 and 13 illustrate alternative sectional views of a recording medium in accordance with embodiments of the present invention.
Figure 13:
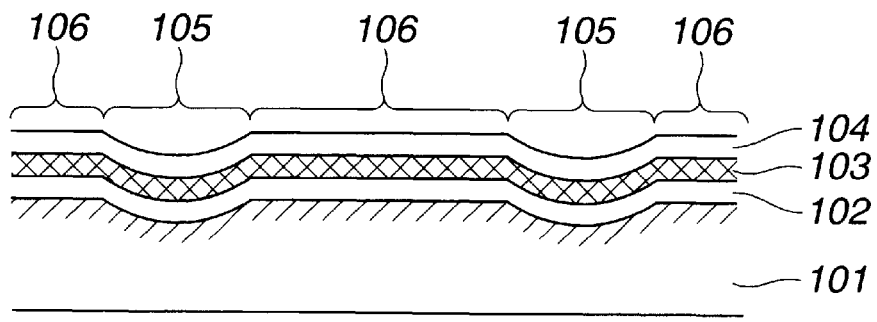

As shown in the sectional views of FIGS. 12 and 13, the same magnetic recording medium 103 as Example 1 was made carried on a substrate 101 formed with rectangular guide groove 105 of a depth 0.1 µm. The substrate 101 also carries an underlayer 102 and a protective layer 104. A side wall of this rectangular guide groove 105 was formed nearly perpendicular to a surface of the substrate 101. The magnetic layers 103 were formed on the substrate using a process such as sputtering which increases the directivity of the sputtered particle, or evaporation, and are therefore separated near the side wall of the guide groove 105 as shown in FIG. 12. Even if the magnetic layers are not completely separated because the layers accumulate slightly on the side wall, the connection on the side wall can be disregarded because the thickness of the portion is very thin in comparison with the other portions.

Figure 14:
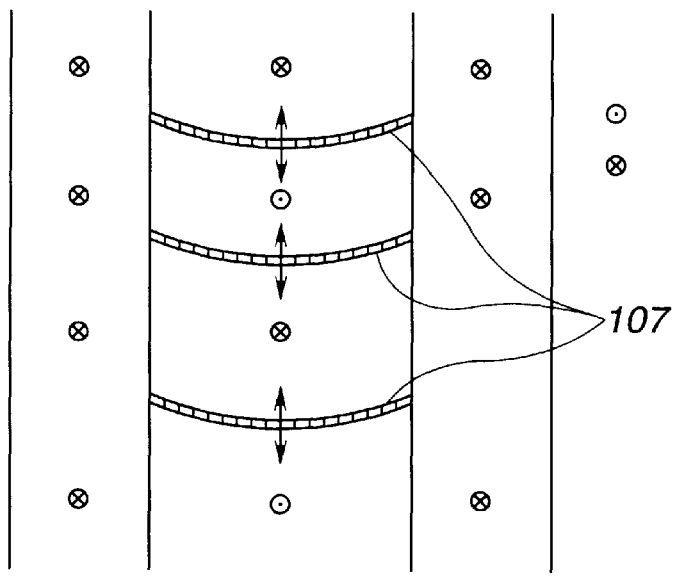
FIG. 14 illustrates a plan view of a recording medium in accordance with an embodiment of the present invention.

As shown in FIGS. 12 and 13, the magnetic layers 103 are uniformly accumulated on the substrate 101 as used in Example 1 between the guide groove 105 and the land 106. Therefore, the magnetic layers between each track are connected to each other.

Where forming the width of the magnetic domain on the land forming the recording track in the magnetic recording medium of example 4, as shown in the plan view of FIG. 14, a non closed domain wall 107 is formed at the boundary portion between the magnetic domains on the land 106. It is possible for such a domain wall 107 to move easily and stably because the production/disappearance of the domain wall does not occur at both side of the recording track when the domain wall moves. As a result, in this example, it was possible to obtain a good C/N and reduce the noise when reproducing.

In the magnetic recording medium of this example, it is also possible to use the guide groove as a recording track in addition to the land 106.

In a further example, only the magnetic layer on the guide groove was annealed by continuously irradiating the medium with a condensed laser beam of a power of 10 mW while rotating the medium of Example 1 at a linear velocity of 1.5 $\mu$m/sec and tracking the guide groove on the medium using a tracking servo. Thereby, the magnetism of the magnetic layer on the guide groove was deteriorated by this process, and the domain wall energy is stopped from being accumulated in this portion.

The magnetic domain having a non closed domain wall was formed over the width of the land of this sample the same as in the previous examples. As a result the reproducing of this sample was the same as for Example 1, and it was possible to obtain a good C/N and reduce the noise when reproducing.

While the present invention has been described with reference to what are presently considered to be the preferred embodiment, it is to be understood that the invention is not limited to the disclosed embodiments. For example, reproducing may be carried out by detecting not only changes of polarisation using the magneto-optical effect but also magnetic changes generated by the displacement of the domain wall. Also, other recording layers may be used such as magnetic materials other than magnetic thin films with a perpendicular magnetization. Further, the interface between each magnetic layer necessarily need not to be distinct, that is, it may be a structure in which the characteristic gradually changes in the thickness direction.

What I claim is:

1. A magnetic recording medium comprising:

a stack of three magnetic layers;

the first magnetic layer being a layer for reproducing information recorded on the medium;

the third magnetic layer being a storage layer for storing the information recorded on the medium in the form of domain walls;

the second magnetic layer having a lower Curie temperature than the first magnetic layer and the third magnetic layer and being provided between the first magnetic layer and the third magnetic layer;

a further magnetic layer being interposed between the first magnetic layer and the second magnetic layer, the further magnetic layer having a larger domain wall energy density than that of the first magnetic layer.

2. A medium according to claim 1, wherein:

the further magnetic layer has a lower Curie temperature than that of the first magnetic layer.

3. The medium according to claim 1 comprising a substrate having a plurality of recording tracks;

the substrate being profiled so as to reduce exchange coupling between the magnetic layers in adjacent tracks.

4. The medium according to claim 1, wherein:

said magnetic layers each comprise rare earth/iron group amorphous alloys.

5. The medium according to claim 1, in which the further magnetic layer has a domain wall energy density at room temperature of between 2 and 6 times as large as that of the first magnetic layer.

6. The medium according to claim 5, in which the further magnetic layer has a domain wall energy density at room temperature of between 3 and 7 erg/cm$^2$.

7. The medium according to claim 1, in which the first magnetic layer has a Curie temperature variation across the thickness of the layer reducing in the direction towards the further magnetic layer.

\* \* \* \* \*

UNITED STATES PATENT AND TRADEMARK OFFICE
CERTIFICATE OF CORRECTION

PATENT NO. : 6,197,440 B1
DATED : March 6, 2001
INVENTOR(S) : Tsutomu Shiratori

It is certified that error appears in the above-identified patent and that said Letters Patent is hereby corrected as shown below:

Column 3,
Lines 37, and 41, "a" (first occurrence) should read -- an --.
Lines 44, and 47, "a" (both occurrence) should read -- an --.

Column 4,
Line 14, "magnetisations" should read -- magnetization --.

Column 5,
Line 18, "magnetisation" should read -- magnetization --.

Column 6,
Line 24, "polarisation" should read -- polarization --.
Line 25, "magnetisation." should read -- magnetization. --.

Column 8,
Line 2, "FiO" should read -- $F_{io}$ --.
Line 36, "realised" should read -- realized --.
Line 47, "the" should read -- a --.

Column 9,
Line 5, "different" should read -- different from --.
Line 6, "to" should read -- from --.
Line 30, "magnetisation" should read -- magnetization --.

Column 10,
Lines 62 and 64, "magnetisation" should read -- magnetization --.

Column 11,
Line 27, "polarisation" should read -- polarization --.
Line 29, "magnetisation" should read -- magnetization --.
Line 44, "curie" should read -- Curie --.

Column 12,
Line 22, "In etc" should read -- In, etc. --.
Line 24, "is consist" should read -- consist --.
Line 44, "element" should read -- elements --.

Column 13,
Line 41, "demagnetising" should read -- demagnetizing --.
Line 48 and 60, "is" should read -- are --.

UNITED STATES PATENT AND TRADEMARK OFFICE
CERTIFICATE OF CORRECTION

PATENT NO. : 6,197,440 B1
DATED : March 6, 2001
INVENTOR(S) : Tsutomu Shiratori

It is certified that error appears in the above-identified patent and that said Letters Patent is hereby corrected as shown below:

<u>Column 17,</u>
Line 35, "polarisation" should read -- polarization --.
Line 40, "necessarily need not to be" should read -- need not necessarily be --.

Signed and Sealed this

Twenty-second Day of January, 2002

Attest:

Attesting Officer

JAMES E. ROGAN
*Director of the United States Patent and Trademark Office*